United States Patent [19]

Bouhier et al.

[11] Patent Number: 4,944,482

[45] Date of Patent: Jul. 31, 1990

[54] HYDRAULIC VIBRATION DAMPING BUSHINGS

[75] Inventors: Bernard Bouhier, Vierzon, France; Bernd-Siegfried Butow, Stuttgart, Fed. Rep. of Germany

[73] Assignee: Hutchinson, France

[21] Appl. No.: 406,336

[22] Filed: Sep. 13, 1989

[30] Foreign Application Priority Data

Sep. 13, 1988 [FR] France .................. 88 11919

[51] Int. Cl.⁵ .................................. F16F 5/00
[52] U.S. Cl. .......................... 248/562; 248/559; 248/636; 267/140.1
[58] Field of Search ............... 248/562, 559, 636, 638, 248/635; 267/141.1, 140.5, 140.1, 141.2, 141.4, 141.5

[56] References Cited

U.S. PATENT DOCUMENTS 4,717,111 1/1988 Saito ....................... 248/562
4,768,760 9/1988 LeFop ...................... 248/562 X

*Primary Examiner*—Alvin C. Chin-Shue
*Attorney, Agent, or Firm*—Larson and Taylor

[57] ABSTRACT

The invention relates to a hydraulic vibration damping bushing comprising two tubular rigid armatures (1, 2) jointly united by an elastomeric body (3) configured in such a way to form between themselves at least two tight pockets (4, 4') communicating with each other by a narrow channel (7), which along with the pockets is filled with a liquid. One of these pockets (4) contains an elastomeric pad (10) added on the concave face of a curved rigid plate (11) which abuts on the internal face of the external armature (2), said pad being, in the resting position of the bushing, diametrically precompressed between the two armatures.

5 Claims, 1 Drawing Sheet

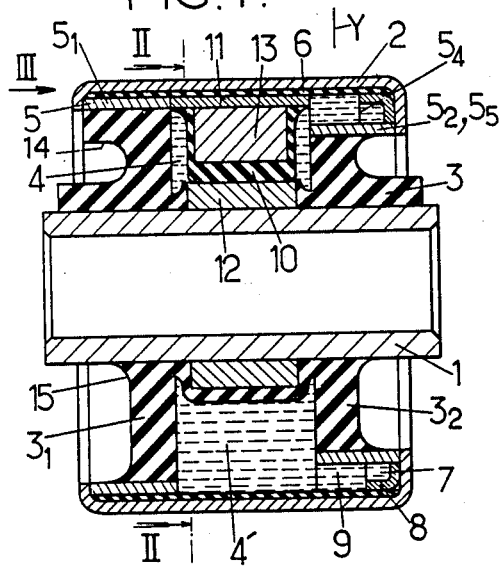
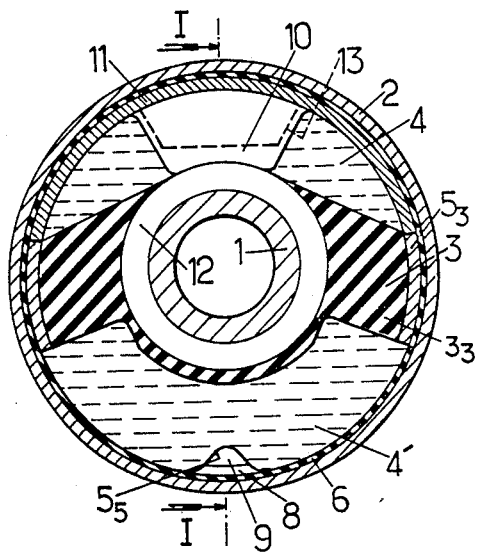
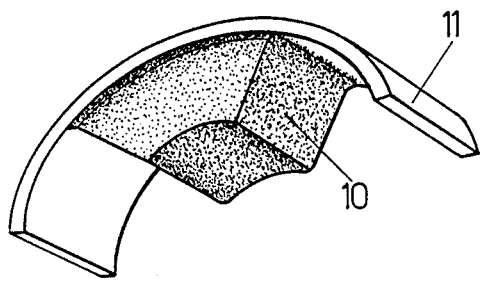
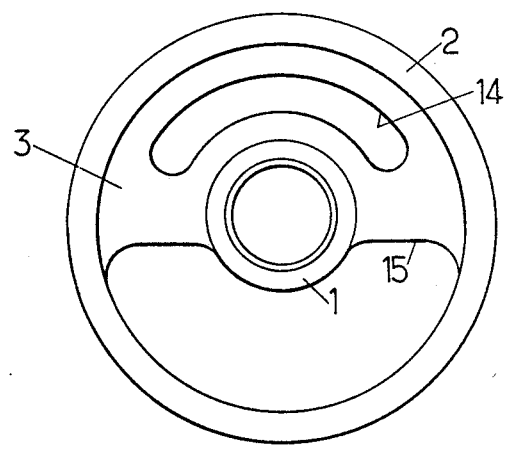

HYDRAULIC VIBRATION DAMPING BUSHINGS

The invention relates to hydraulic vibration damping bushings comprising two tubular rigid armatures or pieces surrounding each other and preferably of revolution at least partially, said armatures being coaxial and concentric at least under load, as well as jointly united by an elatomeric body configured in such a way to form with them at least two tight pockets diametrically opposed in a direction Y and communicating with each other by a narrow channel, said pockets and said channel being filled with a damping liquid.

Such bushings are intended for being mounted between two rigid parts capable of being made integral respectively with the two armatures and likely to be subjected, one with respect to the other, to oscillations oriented in the diametrical direction Y, the whole system being arranged in such a way that, for at least certain of these oscillations, the liquid is alternately forced back from one of the pockets toward the other and conversely through the narrow channel, whereby creating within this liquid, at certain oscillation frequencies, a phenomenon of resonance capable of damping the transmission of said oscillations from one of the armatures to the other.

The bushings of the above type are for example intended for being interposed between, on the one hand, a framework or chassis of a vehicle and, on the other hand, the internal combustion engine or the front or rear wheel-axle unit of such vehicle.

The invention is more particularly concerned, among the aforesaid bushings, with those in which the orifice of the narrow channel, which opens into one of the two pockets is located outside the central areas of the portions, of the two tubular rigid armatures, which define this pocket.

The object of the invention is mainly to cause the bushings of the above type to absorb, in a particularly efficient and gradual way, the heavy diametrical stresses exerted upon them in the direction Y.

To this purpose, according to the invention, the bushings of the above type are essentially characterized, in that they include an elastomeric pad added on the concave face of a rigid plate curved in the manner of a portion of a cylinder of revolution having an angular extent at most equal to 180 degrees, the shapes and dimensions of the pad and of the plate being selected in such a way that the plate permanently abuts on the internal face of the external tubular armature and that, in the resting position of the bushing, the pad is diametrically precompressed between the two armatures and rests on the aforesaid central area of the internal tubular armature.

In preferred embodiments, use is furthermore made or one and/or of the other of the following arrangements:

the elastomeric body is bonded to an external open-worked cylindrical cage and the plate is sized in such a way to fill up one of the apertures of this cage, the pad comprises a concave surface on its top, the shape of which is substantially complementary with the facing surface of the internal tubular armature, the pad is reinforced by an internal rigid armature itself integral with the plate.

The invention comprises, apart from these main arrangements, a plurality of other arrangements which are preferably to be used simultaneously and will be more explicitly described hereinafter.

A preferred embodiment of the invention will now be described with reference to the accompanying drawing given of course as a non-limitative example.

FIGS. 1, 2 and 3 of this drawing show a hydraulic vibration damping bushing used for supporting or linking purposes, established according to the invention, respectively in axial cross-section according to I—I, FIG. 2, in cross-section according to II—II, FIG. 1 and in an end view according to the arrow III of FIG. 1.

FIG. 4 shows in a perspective view a component of this bushing.

In a manner known per se, the illustrated bushing comprises:

a tubular internal metallic armature of revolution 1, a tubular external metallic armature of revolution 2 coaxial to armature 1 at least in the mounted and loaded state of the bushing and surrounding this armature 1, and an elastomeric body 3 connecting the two armatures 1 and 2 to each other by providing between same two tight pockets 4, 4' diametrically opposed in the direction Y.

To be more accurate, the body 3 which features the general shape of two parallel disks $3_1$, $3_2$ mutually joined by a thick and flat spacer $3_3$ in the shape of a widely opened V (see FIG. 2), connects the internal armature 1 to an intermediate rigid cage 5 which is itself force fitted in the armature 2, an elastic lining 6 being interposed therebetween.

The intermediate cage 5 itself consists of two cylindrical collars $5_1$, $5_2$ against which are respectively bonded the peripheries of two disks $3_1$, $3_2$.

These collars are axially spaced by two straps $5_3$ diametrically opposed which define together with said collars two openings radially facing the two pockets 4 and 4': the edges of the thick spacer $3_3$ are bonded onto said straps $5_3$.

The two pockets 4, 4' mutually communicate by two narrow channels 7 and are filled as well as these channels with a damping liquid.

The channels 7 are defined, on the one hand, by two semi-circular grooves $5_4$ featuring an L-shape and provided in a circular ridge of one of the collars ($5_2$), and, on the other hand, by a metallic ring 8 featuring an L-shape overlapping the grooves $5_4$, the openings 9 of the two channels in the two pockets 4 and 4' being formed by providing two radial flattened or hollowed portions $5_5$ in the collar $5_2$.

According to the present invention, the pocket 4 of the bushing thus defined is equipped with a stop making it possible to damp in a gradual way the heavy stresses exerted on this bushing in the direction Y, particularly in the direction which tends to squeeze or crush said pocket 4.

This stop consists of an elastomeric pad 10 added on the middle of the concave face of a plate 11 curved in the manner of a tile or portion of cylinder of revolution.

The top of the pad 10 is itself defined by a concave face capable of abutting against the internal tubular armature 1 or more precisely against a cylindrical bush jointedly surrounding the median portion of this armature.

More generally, the shapes and sizes of the pad and of the plate are selected in such a way that:

the whole extent of the external face of the plate jointedly rests on the lining 6, and in the normal resting position of the bushing, the pad 10 is precompressed, whereby its top jointedly rests on the bush 12.

A reinforcement rigid armature 13, in particular having itself the shape of a solid pad, is advantageously embedded inside the elastomeric pad 10 with a view to reinforcing it. This armature 13 is made integral with the plate, especially by welding.

The edges which define the two circumferential ends of the plate rest against facing edges of the straps $5_3$ and said plate is axially housed virtually without any play between the two collars $5_1$, $5_2$.

In other words, the "tile" or plate 11 externally almost completely closes the pocket 4 but, of course, pad 10 is narrower than this plate so that allowance can be made around it for a continuous volume of damping liquid, volume which smoothly communicates with the corresponding opening 9.

The general shape of said pad 10 is advantageously the one of the frustum of a pyramid as can be clearly seen in FIG. 4.

The angular extent of the tile or plate 11 is at most equal to 180 degrees and preferably relatively wide, viz. at least equal to 90 degrees, in such a way that the prestressing pressure applied onto the external armature can be distributed over a large surface.

The mounting of the aforesaid stop is very simple.

To this end, the plate 11 with its pad 10 facing the axis of the bushing just needs to be placed into the pocket 4, then, this part is elastically inserted inside said pocket so as to press the pad against the bush 12 and the plate 11 against the straps $5_3$, when axially positioning the external tubular armature 2 on the assembly.

There is therefore no need to resort to particular fastening means such as crimping or welding, processes.

Recesses 14, 15 (FIG. 1 and 3), especially in the shape of beans, are provided in the transversal faces which define the bushing at both its axial ends, whereby simultaneously improving the flexibility of this bushing and reducing its weight without however weakening its mechanical strength.

The internal armature 1 is intended for being made integral with a spindle (not shown) which jointedly crosses it, whereas the external armature 2 is intended for being made integral with a bearing (not shown), this spindle and this bearing being made integral respectively with two rigid elements between which one wishes to mount a vibration damping support, elements such as a vehicle engine and the framework or chassis of this vehicle.

The operation of the aforesaid bushing is as follows.

When an oscillation of a relatively low frequency (for example of the order of 10 to 50 Hz) and of a relatively large amplitude (higher than 1 mm) is imposed in the diametrical direction Y to one of the two armatures 1, 2 with respect to the other, the internal liquid is alternately forced back at said frequency into the channels 7 from one of the pockets 4, 4' into the other one and conversely and the dimensions of said channel, in particular its length and cross-section, are determined in such a way that an excellent damping of said oscillation can be obtained for a given value of said frequency due to the creation of a resonance phenomenon in the liquid column then present in the channel.

When a heavy stress is exerted on the bushing in a direction Y in the sense tending to squeeze or crush the pocket 4, the compression of pad 10 is increased from a non-null value, considering the prestress of said pad, whereby providing the latter with a more favourable law of deformation than would have been the case had it not originally been subjected to any compression.

Conversely, the occurrence of a heavy stress in the reverse direction results in a reduction of the prestress of the pad, which may go so far as to cancel its compression and loosen said pad from the bush 12: here again, the law of deformation of the pad which was initially prestressed as a function of the stresses applied to it proves more favorable, as regards the overall damping effect observed, than for a pad which was loosened from the very start from the opposite internal armature.

Consequently, and irrespective of the embodiment adopted, one obtains a hydraulic vibration damping bushing whose constitution, operation and advantages sufficiently appear from the foregoing description.

As goes without saying, and as it furthermore already results from the foregoing, the invention is in no way limited to those of its embodiments and ways of application which have been more particularly considered; on the contrary, it encompasses all of its alternatives.

We claim:

1. A hydraulic vibration damping bushing comprising an external and internal tubular rigid armatures (1, 2), said external armature surrounding said internal armature and jointly united by an elastomeric body (3) configured in such a way to form with said armatures at least two tight pockets (4,4') diametrically opposed and communicating with each other by a narrow channel (7), said pockets and said channel being filled with a damping liquid, and an orifice (9), of the narrow channel (7), which opens into one of a two pockets (4) being located outside a central area of a portion of the said tubular rigid armatures, which define said one pocket, characterized in that it includes an elastomeric pad (10) housed inside said one pocket and secured on a concave face of a rigid plate (11), curved in the manner of a portion of cylinder of revolution having an angular extent at most equal to 180 degrees, the shapes and sizes of the pad and of the plate being selected in such a way that the plate permanently abuts on an internal face of the external tubular armature (2) and that, in a resting position of the bushing, the pad (10) is diametrically precompressed between the two armatures (1, 2) and pressed against the aforesaid central area of the internal tubular armature (1).

2. A bushing according to claim 1, characterized in that the elastomeric body (3) is bonded to an external open-worked cylindrical cage (5) and in that the plate (11) is sized in such a way to fill up an aperture of this cage.

3. A bushing according to claim 1, characterized in that the angular extent of the curved plate (11) is at least equal to 90 degrees.

4. A bushing according to claim 1, characterized in that at its top the pad (10) comprises a concave surface having a shape substantially complementary with (a) facing surface of the internal tubular armature (1).

5. A bushing according to claim 1, characterized in that the pad (10) is reinforced by an internal rigid armature (13) itself integral with the plate (11).

* * * * *